(12) United States Patent
Lee et al.

(10) Patent No.: US 11,227,723 B2
(45) Date of Patent: Jan. 18, 2022

(54) MULTILAYER CERAMIC CAPACITOR

(71) Applicant: SAMSUNG ELECTRO-MECHANICS CO., LTD., Suwon-si (KR)

(72) Inventors: Taek Jung Lee, Suwon-si (KR); Min Gon Lee, Suwon-si (KR); Jin Kyung Joo, Suwon-si (KR); Ji Hong Jo, Suwon-si (KR); Jae Yeol Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 3 days.

(21) Appl. No.: 16/809,917

(22) Filed: Mar. 5, 2020

(65) Prior Publication Data
US 2021/0005384 A1    Jan. 7, 2021

(30) Foreign Application Priority Data
Jul. 4, 2019  (KR) .......................... 10-2019-0080682

(51) Int. Cl.
*H01G 4/236*    (2006.01)
*H01G 4/30*     (2006.01)
(Continued)

(52) U.S. Cl.
CPC ............. *H01G 4/236* (2013.01); *H01G 4/008* (2013.01); *H01G 4/012* (2013.01); *H01G 4/12* (2013.01); *H01G 4/2325* (2013.01); *H01G 4/30* (2013.01)

(58) Field of Classification Search
CPC .......... H01G 4/008; H01G 4/012; H01G 4/12; H01G 4/232; H01G 4/2325; H01G 4/236;
(Continued)

(56) References Cited

U.S. PATENT DOCUMENTS 10,361,035 B1 * 7/2019 Song ..................... H01G 4/224
10,580,579 B2 * 3/2020 Song ..................... H01G 4/008
(Continued)

FOREIGN PATENT DOCUMENTS

JP     2016-12689 A     1/2016
JP     2017-216328 A    12/2017
(Continued)

*Primary Examiner* — Nathan Milakovich
(74) *Attorney, Agent, or Firm* — Morgan, Lewis & Bockius LLP

(57) ABSTRACT

A multilayer ceramic capacitor has a body including first and second internal electrodes laminated with a dielectric layer interposed therebetween, and having fifth and sixth surfaces opposing each other, third and fourth surfaces opposing each other, and first and second surfaces opposing each other. A first through-electrode penetrates through the body to be connected to the first internal electrode, and a second through-electrode penetrates through the body to be connected to the second internal electrode. First and second external electrodes are disposed on the first and second surfaces, respectively, and third and fourth external electrodes are disposed on the first and second surfaces, respectively, to be spaced apart from the first and second external electrodes. Each of the first to fourth external electrodes is a respective sintered electrode including nickel.

26 Claims, 11 Drawing Sheets

(51) Int. Cl.
*H01G 4/12* (2006.01)
*H01G 4/008* (2006.01)
*H01G 4/232* (2006.01)
*H01G 4/012* (2006.01)

(58) Field of Classification Search
CPC .......... H01G 4/252; H01G 4/30; H01G 4/302; H01G 4/385
See application file for complete search history.

(56) References Cited

U.S. PATENT DOCUMENTS

| | | | | |
|---|---|---|---|---|
| 10,784,047 B2* | 9/2020 | Song | ..................... | H01G 4/2325 |
| 10,978,251 B2* | 4/2021 | Song | ..................... | H01G 4/008 |
| 2008/0037199 A1* | 2/2008 | Fukudome | ............. | H01G 4/232 |
| | | | | 361/321.3 |
| 2011/0290542 A1* | 12/2011 | Nishisaka | ............... | H01C 7/008 |
| | | | | 174/257 |
| 2012/0018204 A1* | 1/2012 | Sato | ....................... | H01G 4/232 |
| | | | | 174/260 |
| 2015/0380164 A1 | 12/2015 | Kodama et al. | | |
| 2017/0345562 A1 | 11/2017 | Shimada | | |
| 2018/0027656 A1* | 1/2018 | Jung | ....................... | H05K 1/111 |
| | | | | 174/260 |
| 2018/0090276 A1* | 3/2018 | Ito | ........................ | H01G 4/232 |
| 2019/0074138 A1 | 3/2019 | Song et al. | | |
| 2020/0395176 A1* | 12/2020 | Song | .................... | H01G 4/2325 |
| 2021/0005386 A1* | 1/2021 | Lee | ....................... | H01G 4/232 |
| 2021/0005387 A1* | 1/2021 | Kwon | .................. | H01G 4/008 |
| 2021/0005389 A1* | 1/2021 | Lee | ........................ | H01G 4/012 |
| 2021/0005392 A1* | 1/2021 | Lee | ....................... | H01G 4/008 |
| 2021/0035739 A1* | 2/2021 | Lee | ....................... | H01G 4/1218 |
| 2021/0057158 A1* | 2/2021 | Lee | ........................ | H01G 4/008 |
| 2021/0057159 A1* | 2/2021 | Lee | ....................... | H01G 4/1227 |

FOREIGN PATENT DOCUMENTS

| | | | | |
|---|---|---|---|---|
| KR | 10-2019-0027452 A | 3/2019 | | |
| KR | 20190116123 A | * 10/2019 | ............... | H01G 4/30 |
| KR | 20190116145 A | * 10/2019 | ............. | H01G 4/012 |

* cited by examiner

MULTILAYER CERAMIC CAPACITOR

CROSS-REFERENCE TO RELATED APPLICATION(S)

This application claims benefit of priority to Korean Patent Application No. 10-2019-0080682 filed on Jul. 4, 2019 in the Korean Intellectual Property Office, the disclosure of which is incorporated herein by reference in its entirety.

BACKGROUND

1. Field

The present disclosure relates to a multilayer ceramic capacitor.

2. Description of Related Art

Recently, the use of electronic devices using multilayer ceramic capacitors (MLCCs) has rapidly increased. In particular, as the fifth generation (5G) era has come about, smartphones require a greater number of capacitors and higher capacitance thereof. On the other hand, due to technical miniaturization of set products, a mounting area for passive components such as MLCCs and inductors has decreased, and thus further miniaturization and thinning of the passive components are required. Accordingly, there is a proposed method in which a multilayer ceramic capacitor and an inductor are packaged with an IC and an AP, embedded in a substrate, or mounted on a lower end portion of an AP in an LSC type manner to increase the degree of mounting freedom.

In the above case, not only a decrease in mounting area but also a significant reduction in equivalent series inductance (ESL) generated in a substrate may be achieved. Accordingly, there is increasing demand for a multilayer ceramic capacitor having a small thickness.

However, in a bottom electrode, applied to a low profile capacitor having a significantly low thickness, such as an embedded capacitor and a surface-mount capacitor, adhesion between the bottom electrode and a metal plating layer is poor.

SUMMARY

An aspect of the present disclosure is to provide a multilayer ceramic capacitor having improved adhesive strength when a substrate is mounted or embedded.

Another aspect of the present disclosure is to provide a multilayer ceramic capacitor having improved capacitance while being able to be miniaturized and thinned.

According to an aspect of the present disclosure, a multilayer ceramic capacitor has a body including first and second internal electrodes laminated with a dielectric layer interposed therebetween, and having fifth and sixth surfaces opposing each other in a first direction, third and fourth surfaces opposing each other in a second direction, and first and second surfaces opposing each other in a third direction. A first through-electrode penetrates through the body to be connected to the first internal electrode, a second through-electrode penetrates through the body to be connected to the second internal electrode, first and second external electrodes are disposed on the first and second surfaces, respectively, and each connected to the first through-electrode, and third and fourth external electrodes are disposed on the first and second surfaces, respectively, to be spaced apart from the first and second external electrodes and each connected to the second through-electrode. Each of the first to fourth external electrodes is a respective sintered electrode including nickel.

According to another aspect of the present disclosure, a multilayer ceramic capacitor has a body including alternately stacked first internal electrodes and second internal electrodes laminated with dielectric layers interposed therebetween, first and second through-electrodes penetrating through the body to respectively be connected to the first and second internal electrodes, and first and second external electrodes disposed on a first surface of the body, respectively connected to the first and second through-electrodes, and each including a respective sintered electrode disposed on the first surface of the body and at least one plating layer disposed on the respective sintered electrode. Each of the first internal electrodes, the first through-electrode, and the sintered electrode and at least one plating layer of the first external electrode include nickel (Ni).

According to a further aspect of the present disclosure, a multilayer ceramic capacitor has a body including alternately stacked first internal electrodes and second internal electrodes laminated with dielectric layers interposed therebetween, first and second through-electrodes penetrating through the body to respectively be connected to the first and second internal electrodes, and first and second external electrodes disposed on a first surface of the body and respectively connected to the first and second through-electrodes. Each of the first and second external electrodes includes a sintered electrode layer disposed on the first surface of the body and one or more plating layers sequentially disposed on the sintered electrode layer. Each sintered electrode layer of the first and second external electrodes has a higher average roughness on a surface thereof facing the one or more plating layers than on a surface thereof facing the first surface of the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
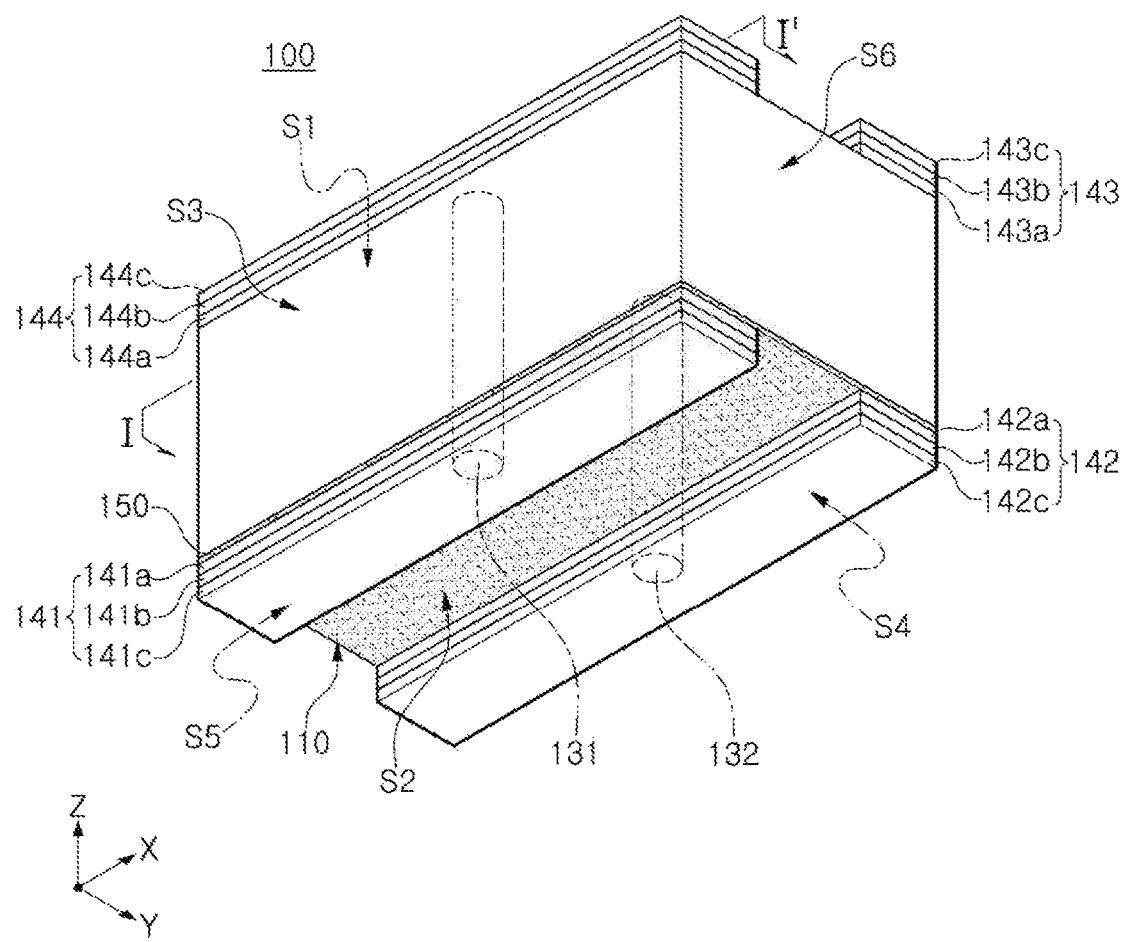
FIG. 1 is a schematic perspective view of a multilayer ceramic capacitor according to an embodiment in the present disclosure.

Hereinafter, example embodiments in the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

In the drawings, an X direction may be defined as a first direction, an L direction, or a length direction, a Y direction may be defined as a second direction, a W direction, or a width direction, and a Z direction may be defined as a third direction, a T direction, or a thickness direction.

Hereinafter, a multilayer ceramic capacitor according to an example embodiment in the present disclosure will be described in detail with reference to FIGS. 1, 2, 3A, and 3B.

A multilayer ceramic capacitor 100 according to an embodiment includes a body 110 including dielectric layers 111 and first and second internal electrodes 121 and 122, alternately disposed with respective dielectric layers 111 interposed therebetween, and having fifth and sixth surfaces S5 and S6 opposing each other in a first direction (an X direction), third and fourth surfaces S3 and S4 opposing each other in a second direction (a Y direction), and first and second surfaces S1 and S2 opposing each other in a third direction (a Z direction). A first through-electrode 131 penetrates through the body 110 to be connected to the first internal electrode (s) 121, a second through-electrode 132 penetrates through the body 110 to be connected to the second internal electrode(s) 122, first and second external electrodes 141 and 144 are respectively disposed on the first and second surfaces S1 and S2 and each connected to the first through-electrode 131, and third and fourth external electrodes 142 and 143 are spaced apart from the first and second external electrodes 141 and 144 and each connected to the second through-electrode 132. Each of the first to fourth external electrodes 141, 144, 142, and 143 may be a sintered electrode including nickel.

In the body 110, the dielectric layers 111 and the internal electrodes 121 and 122 are alternately laminated. A detailed shape of the body 110 is not limited, but the body 110 may have a hexahedral shape, as illustrated in the drawing, or a shape similar to the hexahedral shape. The body 110 may have a substantially hexahedral shape, although it is not necessarily a complete hexahedral shape due to shrinkage of ceramic powder particles during a sintering process.

The body 110 may have the first and second surfaces S1 and S2 opposing each other in a thickness direction (the Z direction), the third and fourth surfaces S3 and S4 connected to the first and second surfaces S1 and S2 and opposing each other in a width direction (the Y direction), and the fifth and sixth surfaces S5 and S6 connected to the first and second surfaces S1 and S2 and to the third and fourth surfaces S3 and S4 and opposing each other in a length direction (the X direction). In this case, among the first, second, third, and fourth surfaces S1, S2, S3, and S4, a selected surface may be a mounting surface.

The plurality of dielectric layers 111 constituting the body 110 may be in a sintered state, and adjacent dielectric layers 111 may be integrated with each other so that boundaries therebetween are not readily apparent without using a scanning electron microscope (SEM).

According to an example embodiment, a raw material of the dielectric layer 111 is not limited as long as a sufficient capacitance can be obtained therewith. For example, the raw material of the dielectric layer 111 may be a barium titanate-based material, a lead composite perovskite-based material, a strontium titanate-based material, or the like. The barium titanate-based material may include $BaTiO_3$-based ceramic powder particles. The ceramic powder particles may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, prepared by partially employing calcium (Ca), zirconium (Zr), and the like. Various ceramic additives, organic solvents, plasticizers, binders, dispersants, and the like, may be added to the powder particles such as barium titanate ($BaTiO_3$), or the like, according to the object of the present disclosure.

First and second cover portions 112 and 113, each having a predetermined thickness, may be disposed below a lowermost internal electrode and above an uppermost internal electrode of the body 110, respectively. The first and second cover portions 112 and 113 may have the same composition as the dielectric layer 111, and may be formed by laminating at least one dielectric layer, not including an internal electrode, below a lowermost internal electrode and above an uppermost internal electrode of the body 110.

The internal electrodes 121 and 122 may include first and second internal electrodes 121 and 122 disposed alternately to face each other with a dielectric layer 111 interposed between each facing pair.

In this case, the first and second internal electrodes 121 and 122 may include first and second insulation portions 122a and 121a, respectively. The first and second insulating portions 122a and 121a refer to regions in which the first and second internal electrodes 121 and 122 are not formed, respectively (e.g., regions free of the first and second internal electrodes 121 and 122, respectively). The first and second insulating portions 122a and 121a may serve to ensure that the first and second internal electrodes 121 and 122 only connect to external electrodes having corresponding polarities. For example, the first connection electrode 131 may be spaced apart from the second internal electrode 122 by the second insulation portion 121a, and the second connection electrode 132 may be spaced apart from the first internal electrode 121 by the first insulation portion 122a.

The first internal electrodes 121 may be connected to the first and second external electrodes 141 and 144 by the first through-electrode 131, and the second internal electrodes 122 may be connected to the third and fourth external electrodes 142 and 143 by the second through-electrode 132, to significantly increase an area in which the first and second internal electrodes 121 and 122 overlap each other with the dielectric layer 111 interposed therebetween. Thus, capacitance of the multilayer ceramic capacitor 100 may be significantly increased.

The first and second internal electrodes 121 and 122 may include nickel (Ni) in highest content (e.g., highest content by mol %, by weight, or the like), but a material of the first and second internal electrodes 121 and 122 is not limited thereto. For example, the first and second internal electrodes 121 and 122 may be formed using a conductive paste including at least one of silver (Ag), palladium (Pd), gold (Au), platinum (Pt), nickel (Ni), tin (Sn), copper (Cu), tungsten (W), palladium (Pd), titanium (Ti), and alloys thereof. The conductive paste may be printed by a screen printing method or a gravure printing method, but a printing method of the conductive paste is not limited thereto.

The through-electrodes 131 and 132 may include nickel (Ni) in highest content, but a material of the through-electrodes 131 and 132 is not limited thereto. For example, the through-electrodes 131 and 132 may be formed using a conductive paste including at least one of silver (Ag), palladium (Pd), gold (Au), of nickel (Ni), tin (Sn), copper (Cu), tungsten (W), palladium (Pd), titanium (Ti), and alloys thereof. A method of forming the through-electrodes 131 and 132 is not limited. For example, the through-electrodes 131 and 132 may be formed by forming a laminate in which the first and second internal electrodes 121 and 122 are laminated, penetrating the body 110 in a third direction (the Z direction) using laser drilling, mechanical pin punching, or the like, and filling the conductive paste.

In an example, the internal electrodes 121 and 122 and the through-electrodes 131 and 132 may include the same metal material as each other and/or may have the same composition as each other. The same metal material may be nickel (Ni), but is not limited thereto. For example, the same metal material may be silver (Ag), palladium (Pd), gold (Au), platinum (Pt), nickel (Ni), copper (Cu), tungsten (W), palladium (Pd), titanium (Ti), and alloys thereof. In the case in which the internal electrodes 121 and 122 and the through-electrodes 131 and 132 of the multilayer ceramic capacitor 100 include the same metal material as each other and/or have the same composition as each other, a sintering initiation temperature and/or a sintering shrinkage ratio may be matched to prevent cracking, delamination, or the like from occurring.

Figure 2:
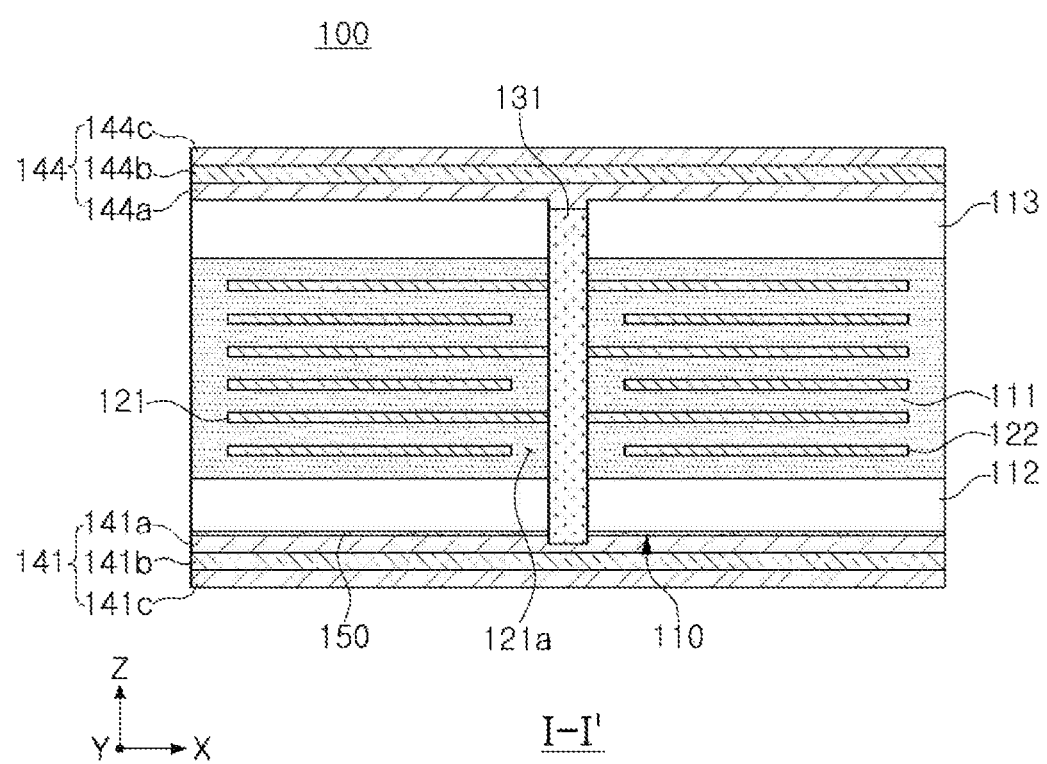
FIG. 2 is a cross-sectional view taken along line I-I' of FIG. 1.
Figure 3A:
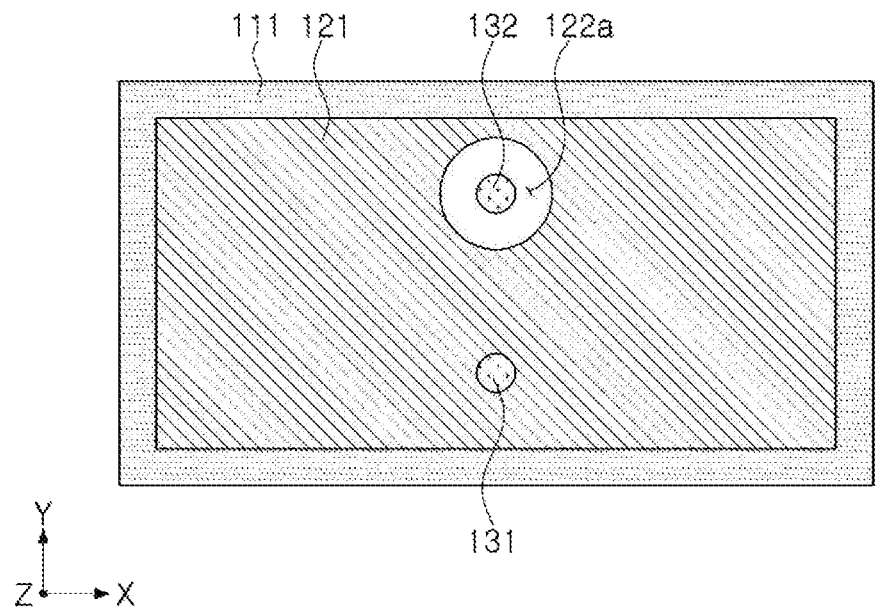
FIGS. 3A and 3B are cross-sectional views along the X-Y plane of FIG. 1 and respectively showing a first and a second internal electrode.
Figure 3B:
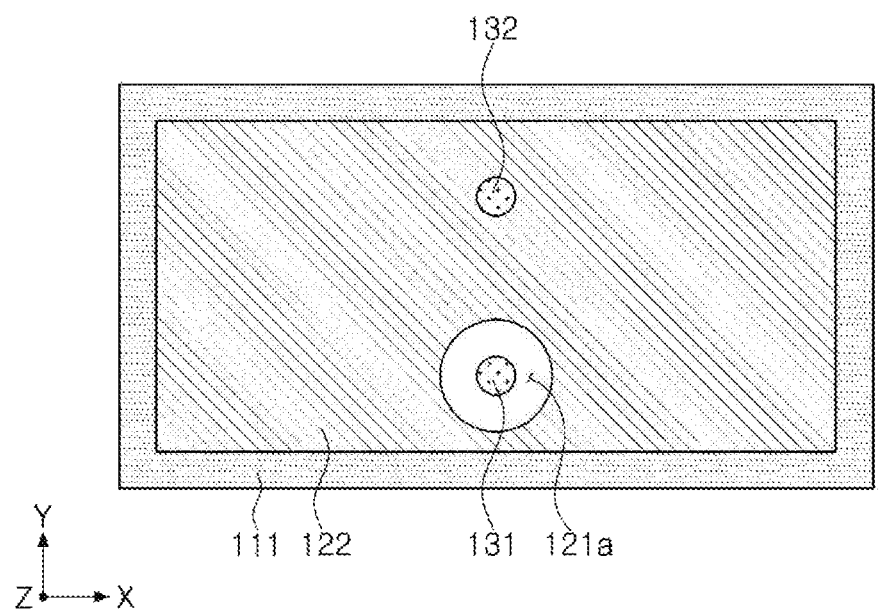
Figure 4:
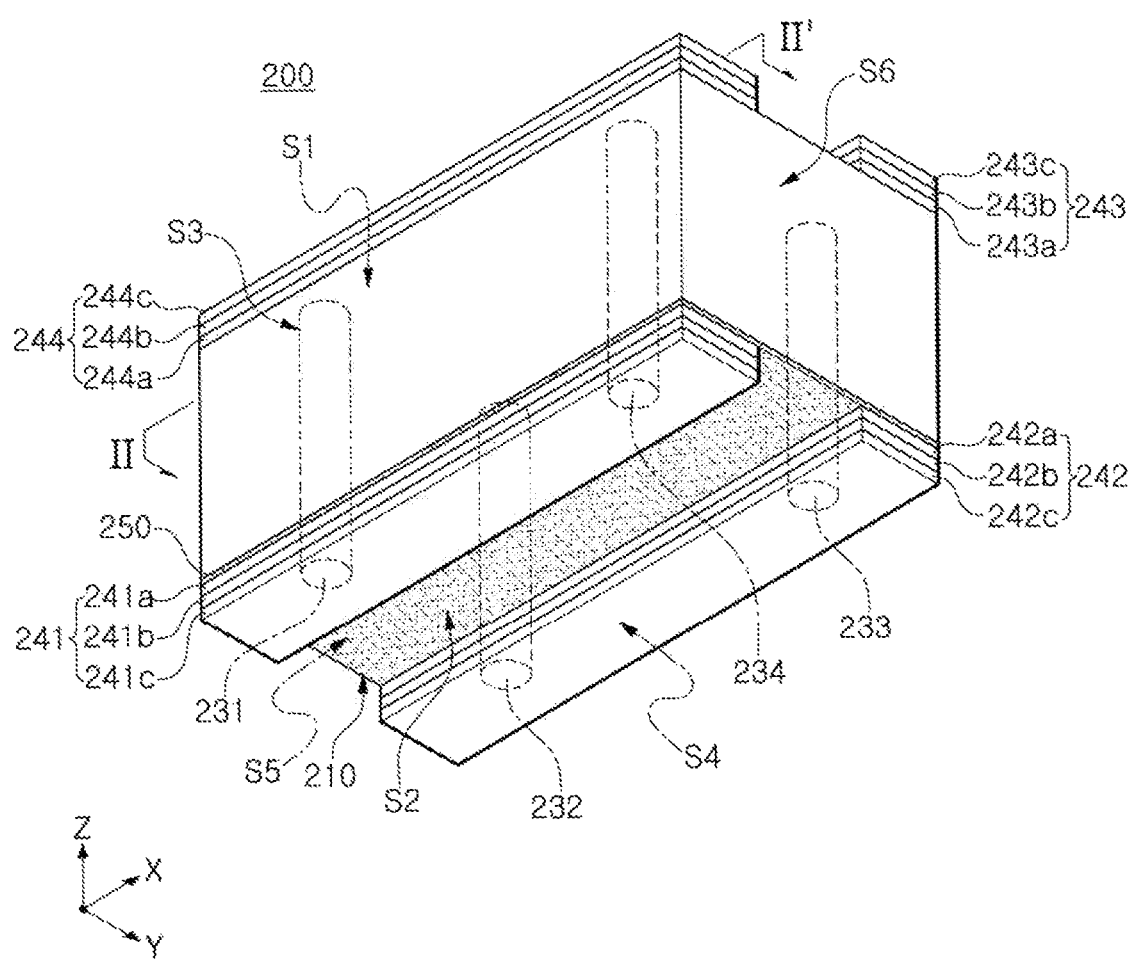
FIG. 4 is a schematic perspective view of a multilayer ceramic capacitor according to another embodiment in the present disclosure.
Figure 5:
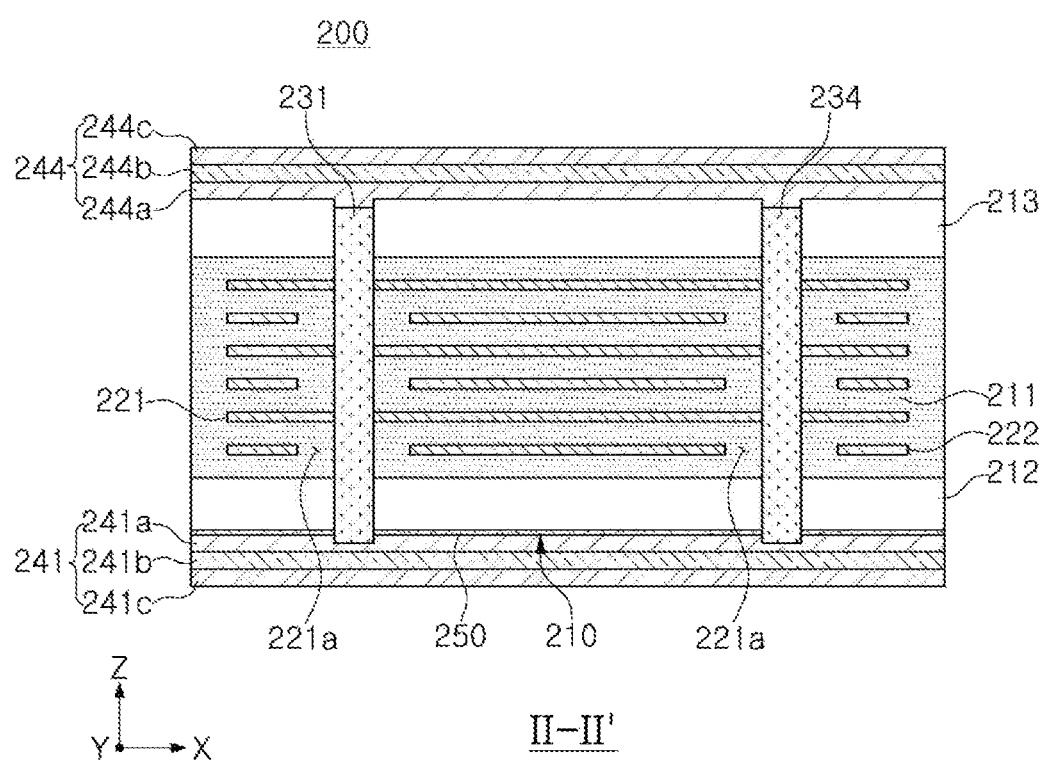
FIG. 5 is a cross-sectional view taken along line II-II' of FIG. 4.

In an embodiment, the through-electrodes 131 and 132 may protrude in the Z direction. Referring to FIG. 2, the through-electrode 131 may protrude from the second surface of the body 110, for example as a result of a phenomenon in which the through-electrode is pushed out to the outside of a through-hole of the body 110 due to sintering shrinkage, or the like, during formation of the through-hole or through-electrode. Since delamination of the electrode may occur depending on a size of the protrusion during inside or surface mounting on a substrate, adhesive strength may be reduced. In the multilayer ceramic capacitor according to the present disclosure, external electrodes (e.g., 144 and 141 in FIG. 2) may be formed on both first and second surfaces of the body to prevent the fixing force from being deteriorated by the protrusion.

In the present specification, each of the through-holes 131 and 132 is illustrated as having a circular shape. However, the through-holes 131 and 132 may have a square or triangular shape and a shape thereof is not limited thereto. The through-electrodes 131 and 132 may be formed to occupy 5 to 65% in a width direction (the Y direction) of the body, but the present disclosure is not limited thereto. For example, diameters of the through-electrodes 131 and 132 (or dimensions of the through-electrodes 131 and 132 in the Y direction) may be 5 to 65% of the width direction of the body 110 in the Y direction.

In an example, the body 110 may have a thickness of 100 µm or less. The thickness of the body 110 may be a vertical distance between the first surface and the second surface, and a lower limit thereof is not limited but may be, for example, 5 µm or more. Since the body 110 has a thickness of 100 µm or less, the multilayer ceramic capacitor according to the present disclosure may be applied to a substrate-embedded multilayer ceramic capacitor and/or a capacitor mounted in an LSC type on a lower end portion of an AP (application processor).

According to an embodiment, the first to fourth external electrodes 141, 144, 142, and 143 may be disposed on both opposing external surfaces of the body 110. The first and second external electrodes 141 and 144 may respectively be disposed on the second surface S2 and the first surface S1 of the body 110 and may be electrically connected to each other by the above-mentioned first through-electrode 131. The third and fourth external electrodes 142 and 143 may be spaced apart from the first and second external electrodes 141 and 144 and may be respectively disposed on the second and first surfaces S2 and S1 of the body 110, and may be electrically connected by the above-mentioned second through-electrode 132.

In the multilayer ceramic capacitor 100 having the above-described structure, a margin portion, extending between internal electrodes 121 and 122 and side surfaces S3-S6 of the body 110 from a top surface and a bottom surface of the body 110, may be decreased to increase a region in which the first and second internal electrodes 121 and 122 are formed. Thus, capacitance of the multilayer ceramic capacitor may be significantly increased. For example, since the multilayer ceramic capacitor 100 according to an embodiment has an electrode structure in which no external electrode is disposed on a side surface, and internal electrodes are connected to external electrodes by through-electrodes penetrating through the body, the capacitance of the multilayer ceramic capacitor may be significantly increased.

Hereinafter, a structure of the first external electrode 141 will be described with reference to FIG. 2. The description of the structure of the first external electrode 141 may be applied to the second to fourth external electrodes 144, 142, and 143 in the same manner.

Referring to FIG. 2, the first external electrode 141 may include a first sintered electrode 141*a* and first and second plating layers 141*b* and 141*c*. The first sintered electrode 141*a* may include at least one of silver (Ag), palladium (Pd), gold (Au), platinum (Pt), nickel (Ni), tin (Sn), copper (Cu), tungsten (W), palladium (Pd), titanium (Ti), and alloys thereof. For example, the first sintered electrode 141*a* may be a sintered electrode formed by sintering a conductive paste including nickel (Ni). Similarly to the first sintered electrode 141*a*, when the external electrode 141 is formed as a sintered electrode, the external electrode 141 may be formed simultaneously with the body 110 and the internal electrodes 121 and 122, and adhesive strength between the body 110 and the external electrode 141 may be further improved.

In an example, centerline average roughness Ra of the surfaces of the first to fourth external electrodes 141, 144, 142, and 143 (e.g., centerline average roughness Ra of the surfaces of the first to fourth sintered electrodes 141*a*, 144*a*, 142*a*, and 143*a*) may range from 1 nm to 100 nm. For example, the centerline average roughness Ra of the first to fourth sintered electrodes 141*a*, 144*a*, 142*a*, and 143*a* may be higher (e.g., range of 1-100 nm) on surfaces thereof facing the respective plating layer 141*b*, 144*b*, 142*b*, 143*b* than on one or more other surfaces thereof (e.g., a surface facing the body 110). In the present specification, the "center line average roughness Ra" may refer to an average value of distances to a virtual centerline. An external electrode, having a centerline average roughness Ra ranging from 1 nm to 100 nm, may refer to an external electrode having surface roughness having the above-mentioned range, and may refer to an external electrode having surface roughness artificially formed or subjected to processing to satisfy the above-mentioned range.

The centerline average roughness Ra is a value calculated by drawing a virtual centerline for roughness on the surfaces of the first to fourth external electrodes 141, 144, 142, and 143, measuring respective distances (for example, r1, r2, r3, . . . , and rn) from the virtual centerline of the roughness to the surface of the respective external electrode, and obtaining an average value Ra as given by Equation 1.

$$Ra = \frac{\sum_1^n r_n}{n} \qquad \text{Equation 1}$$

An external electrode, having centerline average roughness Ra satisfying the above range, may be formed by surface modification using a physical or chemical method. The surface modification method is not limited as long as the above-described roughness may be provided. For example, the surface modification method may be surface treatment using an acidic or basic solution or physical polishing using an abrasive.

Generally, an oxide layer is formed on a surface of a sintered electrode including nickel, or the like, in a sintering process. Therefore, it may be difficult to form a plating layer and the plating layer may easily peel off. When the external electrode according to an embodiment is surface-modified to satisfy the centerline average roughness Ra of the above-described range, an oxide layer may be removed or a surface having a predetermined roughness may be formed. Thus, adhesion between the external electrode and the plating layer may be enhanced and the plating layer may be prevented from peeling off.

The first plating layer 141b according to an embodiment may be a plating layer including nickel, and the second plating layer 141c may be a plating layer including copper or tin. The first plating layer 141b may include nickel to improve adhesion to the first sintered electrode 141a. Also, the second plating layer 141c may include copper or tin to form an external electrode with improved conductivity, plating adhesion, and solderability.

In an example, each of the first to fourth external electrodes 141, 144, 142, and 143 may have a thickness ranging from 3 μm to 30 μm. The thickness of each of the first to fourth external electrodes 141, 144, 142, and 143 may refer to the overall thickness of the respective sintered electrode (141a, 144a, 142a, or 143a), the respective first plating layer (141b, 144b, 142b, or 143b), and the respective second plating layer (141c, 144c, 142c, or 143c) laminated together, and may refer to a vertical distance (e.g., in the Z direction) from the body 110 to the outermost surface (e.g., top-most or bottom-most) of the respective external electrode. The thickness of the external electrode may be adjusted within the above range to obtain improved mountability without occupying a large space when used for surface mounting or substrate embedding.

FIGS. 4, 5, 6A, 6B, 7A, and 7B illustrate a multilayer ceramic capacitor according to another embodiment in the present disclosure. Hereinafter, the multilayer ceramic capacitor according to the other embodiment in the present disclosure will be described in detail with reference to FIGS. 4, 5, 6A, 6B, 7A, and 7B.

A multilayer ceramic capacitor 200 according to another embodiment includes a body 210 in which one or more first internal electrode(s) 221, dielectric layer(s) 211, and second internal electrode(s) 222 are laminated, first to fourth connection electrodes 231, 232, 233, and 234 are provided, and first to fourth external electrodes 241, 244, 242, and 243 are provided. Materials and configurations of the dielectric layer(s) 211, the first and second internal electrodes 221 and 222, and the first to fourth external electrodes 241, 244, 242, and 243 are the same as those described above, and thus, descriptions thereof will be omitted.

The multilayer ceramic capacitor 200 may include a first connection electrode 231, a second connection electrode 232, a third connection electrode 233, and a fourth connection electrode 234, the first and fourth connection electrodes 231 and 234 may be electrically connected to the first and second external electrodes 241 and 244, and the second and third connection electrodes 232 and 233 may be electrically connected to the third and the fourth external electrodes 242 and 243. As described above, since a plurality of connection electrodes may be provided to connect the first external electrode and the second external electrode and to connect the third external electrode and the fourth external electrode, fixing strength between the external electrodes and the body may be further enhanced.

Figure 6A:
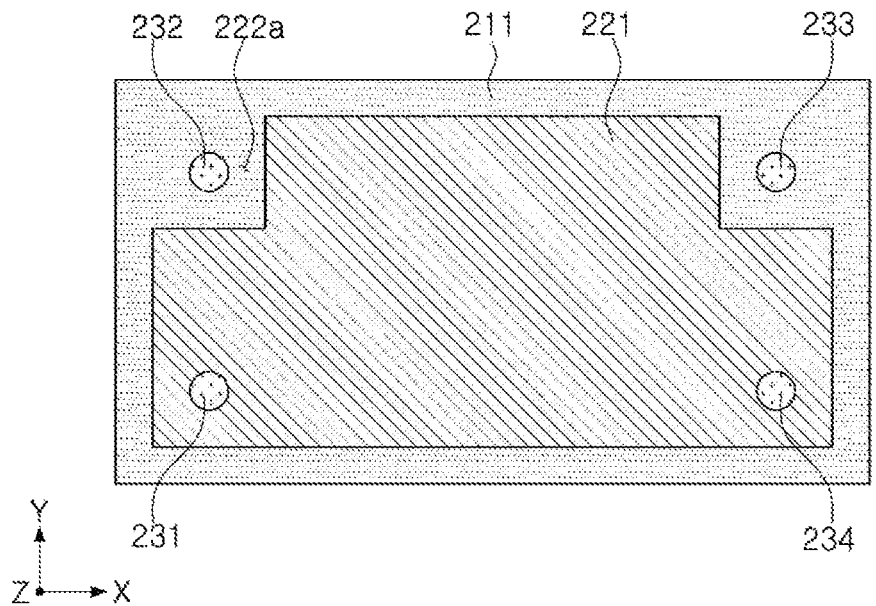
FIGS. 6A and 6B are cross-sectional views along the X-Y plane of FIG. 4 and respectively showing a first and a second internal electrode.
Figure 6B:
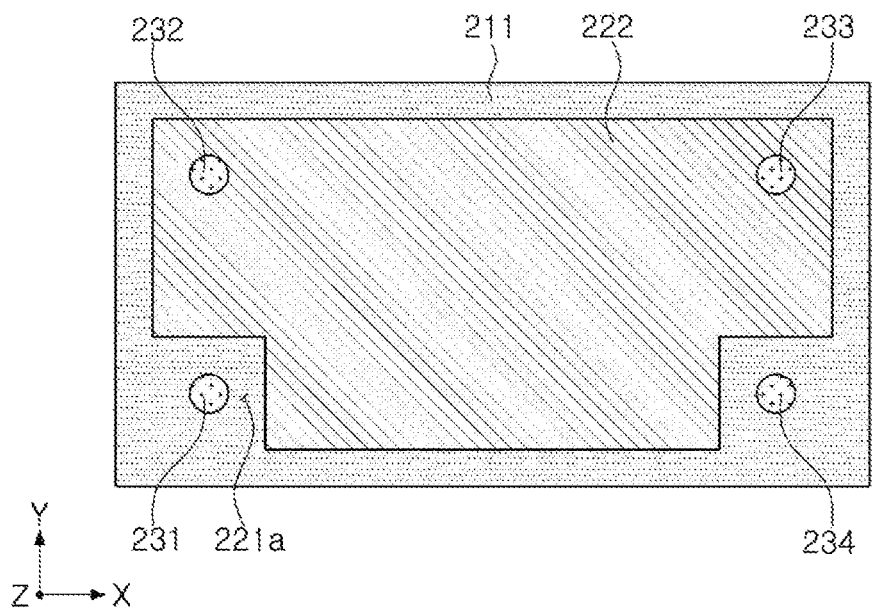

FIGS. 6A and 6B show cross-sectional views illustrating shapes of the first internal electrode 221 and the second internal electrode 222. Referring to FIGS. 6A and 6B, the first internal electrode 221 and the second internal electrode 222 may have a T shape to be point-symmetrical to each other. The first internal electrode 221 may have a T-shaped electrode pattern. A non-disposition region 222a, in which no electrode pattern of the first internal electrode 221 is provided, may be an insulating region. The second internal electrode 222 may have a T-shaped electrode pattern. A non-disposition region 221a, in which no electrode pattern of the second internal electrode 222 is provided, may be an insulating region.

In the multilayer ceramic capacitor having the electrode pattern, the first and fourth connection electrodes 231 and 234 may be connected to the first internal electrode (s) 221 and may penetrate through the non-disposition region 221a of the second internal electrode(s) 222. The second and third connection electrodes 232 and 233 may be connected to the second internal electrode(s) 222 and may penetrate through the non-disposition region 222a of the first internal electrode(s) 221. With the structure in which the connection electrodes penetrate through the non-disposition region of the internal electrodes, the multilayer ceramic capacitor according to the present disclosure may offset mutual inductance to improve equivalent series inductance (ESL) and may increase in capacitance, as compared with a structure in which a via hole is formed in an internal electrode.

Figure 7A:
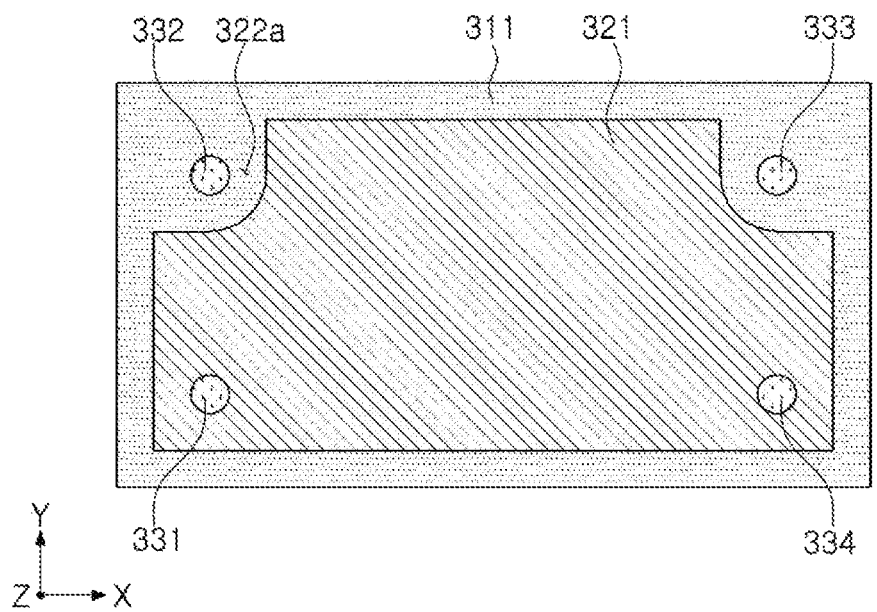
FIGS. 7A and 7B are cross-sectional views along the X-Y plane of FIG. 4 and respectively showing a first and a second internal electrode according to another embodiment.
Figure 7B:
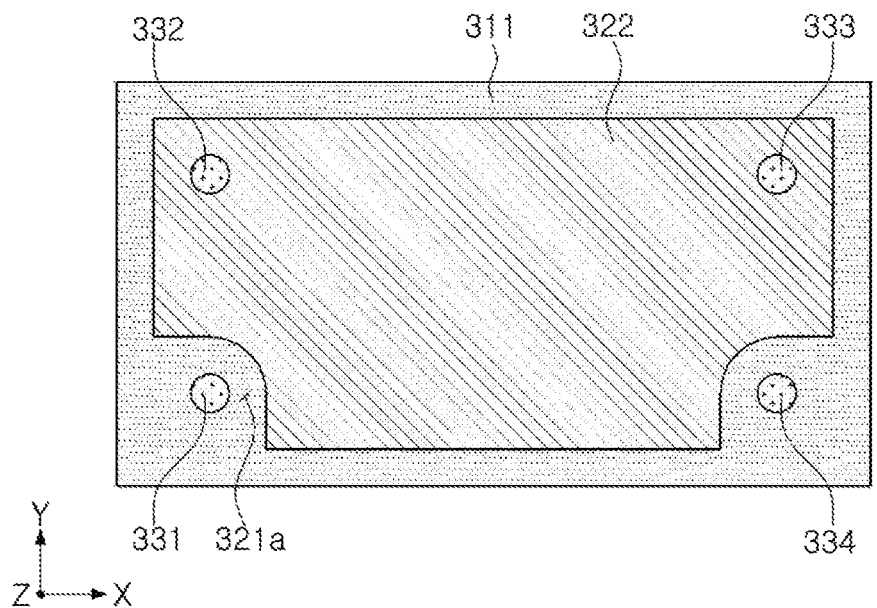

In an example, the non-disposition regions 321a and 322a of the second and first internal electrodes 322 and 321 may be rounded. Referring to FIGS. 7A and 7B, the first internal electrode 321 may have a T-shaped electrode pattern, and the non-disposition region 322a in which the first internal electrode 321 is not disposed (e.g., the region free of the first internal electrode 321) may be formed to have a rounded shape or rounded corner. The second internal electrode 322 may have a T-shaped electrode pattern, and the non-disposition region 321a in which the second internal electrode 322 is not disposed (e.g., the region free of the second internal electrode 322) may be formed to have a rounded shape or rounded corner. When a depressed portion or corner of the internal electrode pattern is formed to be rounded as described above, capacity of the multilayer ceramic capacitor may be further increased.

Illustrative cases in which the non-disposition regions of the internal electrodes have a square shape and a rounded shape have been described as examples, but shapes of the internal electrode patterns are not limited thereto. For example, the internal electrodes may have various shapes such as a triangular shape, a polygonal shape, and the like, which all belong to the scope of the present disclosure.

Figure 8A:
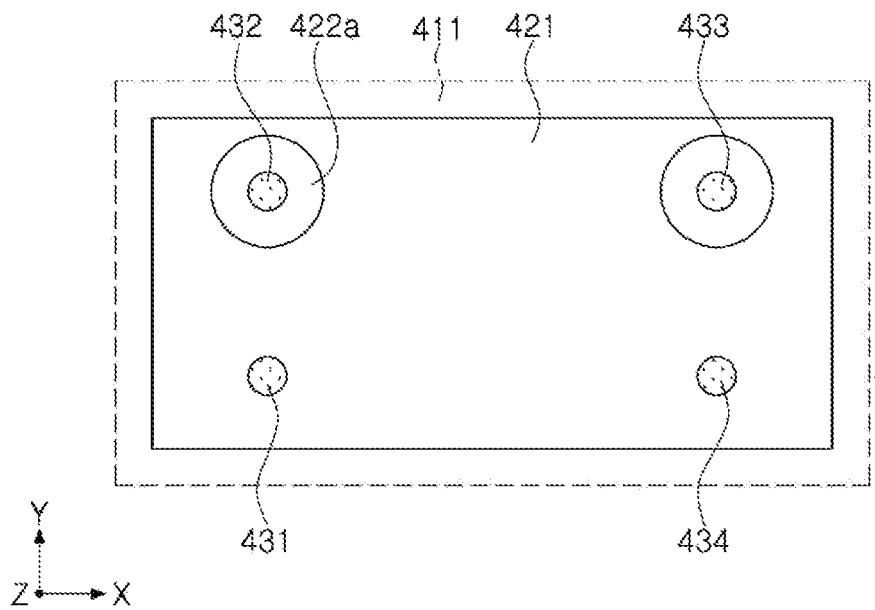
FIGS. 8A and 8B are cross-sectional views along the X-Y plane of FIG. 4 and respectively showing a first and a second internal electrode according to a further embodiment.
Figure 8B:
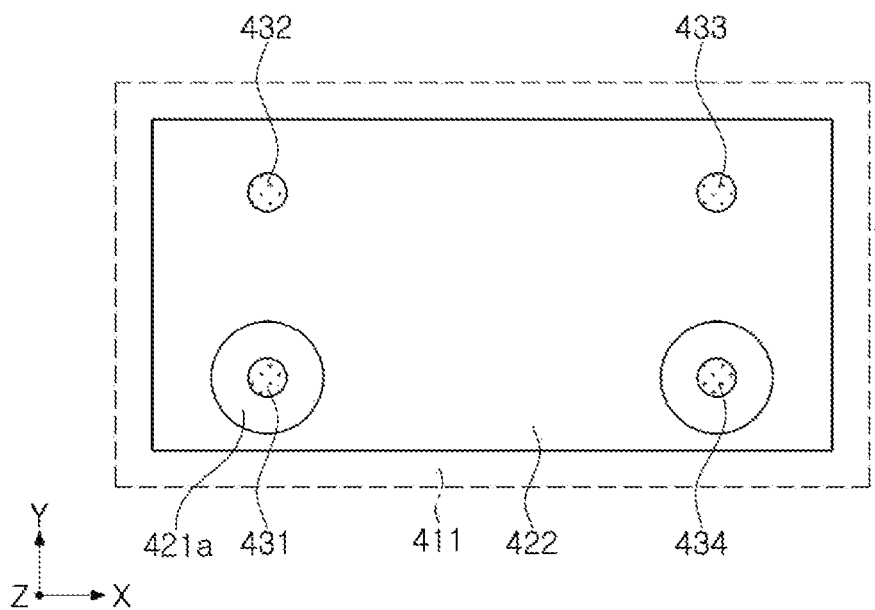
Figure 9:
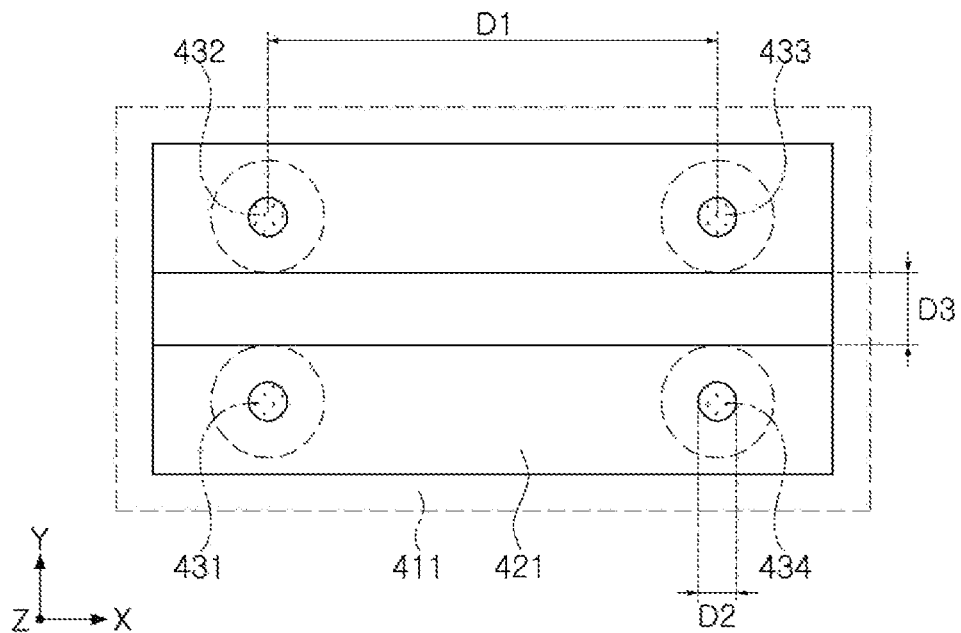
FIG. 9 is a top view of the further embodiment of FIG. 4 when viewed in an S1 direction.

FIGS. 8A, 8B, and 9 are cross-sectional views illustrating another embodiment in the present disclosure. Referring to FIGS. 8A, 8B, and 9, first and second internal electrodes 421 and 422 may be point-symmetrical to each other, and each of the first and second internal electrodes 421 and 422 may have a rectangular shape. The first internal electrode 421 may have second and third via holes, and the second internal electrode 422 may have first and fourth via holes. In this case, the first and fourth connection electrodes 431 and 434 may be connected to the first internal electrode (s) 421 and may penetrate through the first and fourth via holes 421a of the second internal electrode 422. The second and third connection electrodes 432 and 433 may be connected to the second internal electrode (s) 422 and may penetrate through the second and third via holes 422a of the first internal electrode 421. The first and fourth connection electrodes 431 and 434 are disposed to penetrate through the first and fourth via holes 421a of the second internal electrode 422, such that the first and fourth connection electrodes 431 and 434 may be electrically insulated from the second internal electrode 422. The second and third connection electrodes 432 and 433 are disposed to penetrate through the second and third via holes 422a of the first internal electrode 421, such that the second and third connection electrodes 432 and 433 may be electrically insulated from the first internal electrode 421.

FIG. 9 illustrates a distance D1 between the first and fourth connection electrodes 431 and 434 (e.g., between centers of the first and fourth connection electrodes 431 and 434) or a distance D1 between the second and third connection electrodes 432 and 433 (e.g., between centers of the second and third connection electrodes 432 and 433), a diameter D2 of each of the first to fourth connection electrodes 431, 432, 433 and 434, and a distance D3 between a first via hole 422a and a second via hole 421a, or an a distance D3 between the third via hole and the fourth via hole.

Referring to FIG. 9, a ratio D1/D3 of the distance D1 between the first and fourth connection electrodes 431 and 434 or the distance D1 between the second and third connection electrodes 432 and 433 to the distance D3 between the first via hole and the second via hole (D1/D3) may range from 2.08 to 4.7. The ratio D1/D3 may be 2.08 or more, 2.20 or more, 2.30 or more, 2.40 or more, 2.50 or more, 2.60 or more, 2.70 or more, 2.80 or more, 2.90 or more, 3.00 or more, 3.05 or more, 3.10 or more, or 3.15 or more, and may 4.700 or less, 4.695 or less, 4.690 or less, or 4.688 or less. However, the ratio D1/D3 is not limited thereto. When the ratio D1/D3 of the distance D1 between the first and fourth connection electrodes 431 and 434 or the distance D1 between the second and third connection electrodes 432 and 433 to the distance D3 between the first via hole and the second via hole satisfies the above range, equivalent series inductance (ESL) is reduced. In detail, when the ratio is 3.125 or more (e.g., range from 3.125 to 4.7), the ESL reduction effect may be significantly improved.

In another embodiment, a ratio D2/D3 of the diameter D2 of the first connection electrode 431 or the second connection electrode 432 to the distance D3 between the first via hole and the second via hole (D2/D3) may range from 0.375 to 0.52. The ratio D2/D3 of the diameter D2 of the first connection electrode 431 or the second connection electrode 432 to the distance D3 between the first via hole and the second via hole may be 0.375 or more, 0.380 or more, 0.385 or more, 0.390 or more, 0.395 or more, 0.400 or more, 0.405 or more, or 0.410 or more, and may be 0.52 or less. When the ratio D2/D3 of the diameter D2 of the first connection electrode 431 or the second connection electrode 432 to the distance D3 between the first via hole and the second via hole satisfies the above range, equivalent series inductance (ESL) may be reduced. In detail, when the ratio D2/D3 is 0.41 or more, the ESL reduction effect may be significantly improved. When the ratio D2/D3 is 0.52 or more, the capacitance of the multilayer ceramic capacitor may be reduced.

FIGS. 10 to 14 illustrate a method of manufacturing the multilayer ceramic capacitor illustrated in FIGS. 1, 2, 3A, 3B, and 4. A method of manufacturing the multilayer ceramic capacitor illustrated in FIGS. 1, 2, 3A, 3B, and 4 will be described with reference to FIGS. 10 to 14. From the description of the method of manufacturing the multilayer ceramic capacitor, a structure of the multilayer ceramic capacitor may be illustrated more clearly.

Figure 10:
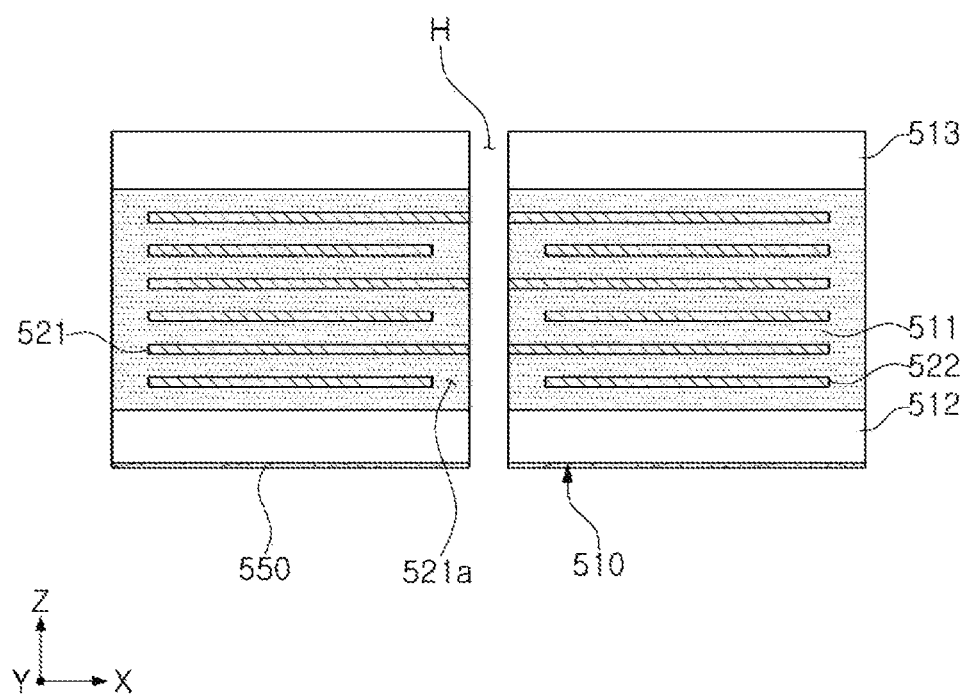
FIGS. 10 to 14 illustrate processes of manufacturing a multilayer ceramic capacitor according to an embodiment in the present disclosure.

As illustrated in FIG. 10, a body 510 including dielectric layer(s) 511 and first and second internal electrodes 521 and 522, disposed with the dielectric layers 511 interposed therebetween, may be prepared by laminating a plurality of sheets, on which a paste including a conductive metal is printed on one surface thereof. A first cover portion 512 and a second cover portion 513 may be formed by laminating dielectric layers, each not including an internal electrode, on upper and lower portions of the body 510.

In an example, an identification portion 550 may be disposed on the first cover portion 512 or the second cover portion 513, as appropriate. The identification portion 550 may be formed on one of the first cover layer 512 and the second cover layer 513 and may serve to identify the upper and lower portions of the body 510 using a difference in brightness or color. The identification portion 550 may be a dielectric layer in which a single ceramic green sheet is sintered or a plurality of ceramic green sheets are laminated, and may be included in the first cover portion 512 or the second cover portion 513. The bodies 110 and 210, shown in and described in relation to FIGS. 1, 2, 4, and 5, may respectively include an identification portion 150 or 250 similar to identification portion 550 described here.

A method of allowing the identification portion 550 to have brightness or color, different from brightness or color of the first cover portion 512 or the second cover portion 513, is not limited. The identification portion 550 may be formed using ceramics particles, having sizes different from sizes of the ceramic particles included in the body 510, or may be formed by adding an oxide of at least one metal selected from Ni, Mn, Cr, Mg, Y, and V, $BaSiO_3$, or $CaSiO_3$ to the ceramic particles. However, a material of the identification portion 550 is not limited thereto. When the identification portion 550 is disposed, the upper and lower portions of the body 510 may be distinguished from each other and a direction of a protrusion, from which the above-described through-hole or connection electrodes protrude(s), may be confirmed. Thus, the multilayer ceramic capacitor according to the present disclosure may be mounted on a substrate by selecting a direction having better adhesive strength.

Figure 11:
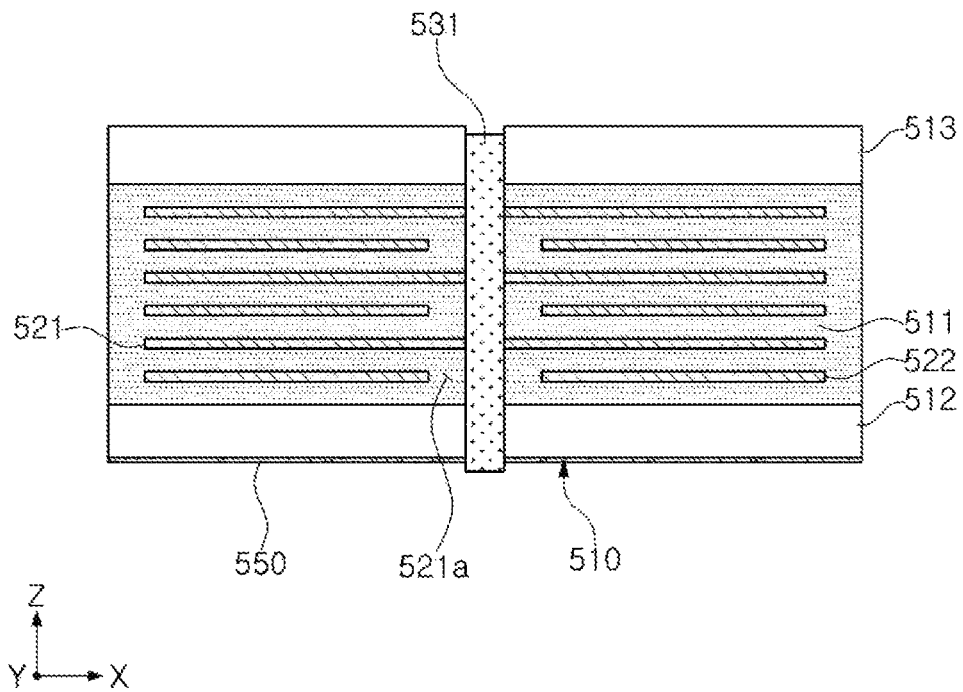
Figure 12:
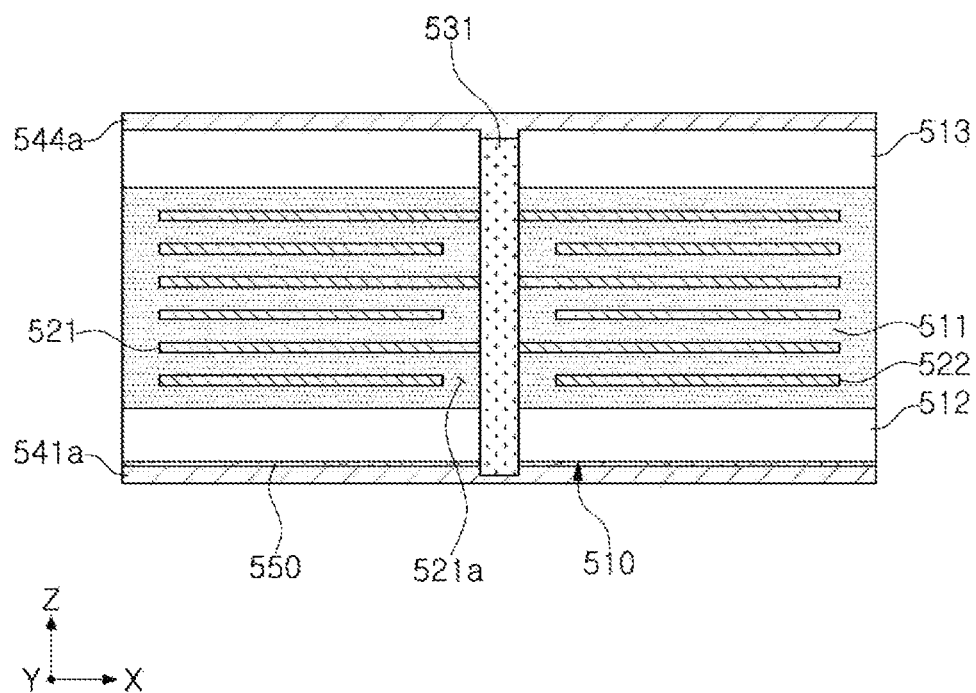
Figure 13:
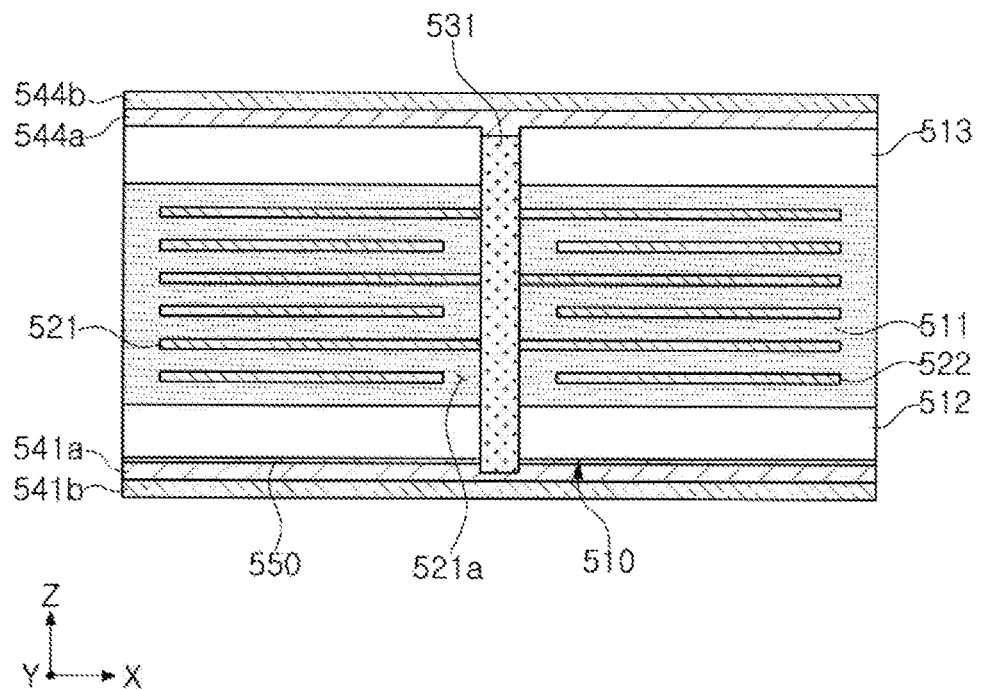

After the cover portion is formed, vias H are formed in the body 510 using laser drilling or mechanical pin punching. As illustrated in FIG. 11, first and second through-electrodes 531 and 532 are formed by applying a conductive paste to the vias H or filling a conductive material using plating or the like.

Then, first to fourth external electrodes 541, 544, 542, and 543 are formed on opposing surfaces of the body 510 to be connected to the first and second through-electrodes 531 and 532.

Figure 14:
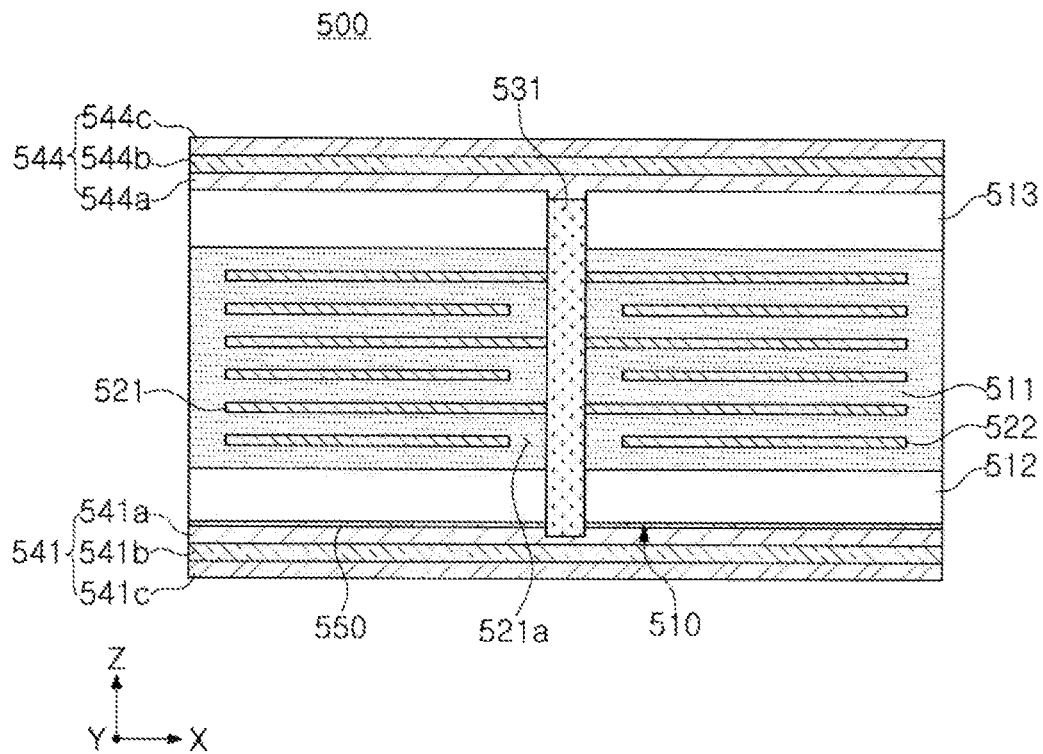

More specifically, the first to fourth external electrodes 541, 544, 542, and 543 may be formed by forming first to fourth sintered electrodes, each including nickel, on the body 510 (FIG. 12), forming a first plating layer on each of the first to fourth sintered electrode layers (FIG. 13), and forming a second plating layer on each of the first plating layers (FIG. 14).

The sintered electrode may be formed by applying a conductive paste, including nickel, and sintering the conductive paste. The first plating layer may include nickel and may be formed by an electrical or chemical plating method. The second plating layer may include copper or tin and may be formed by an electric or chemical plating method.

After a sintered electrode is formed, sintering and plasticization are performed to form the first plating layer and the second plating layer. As a result, the multilayer ceramic capacitor, illustrated in FIGS. 1, 2, 3A, 3B, and 4, is completed.

As described above, according to an embodiment, adhesive strength of a multilayer ceramic capacitor may be improved by applying a sintered electrode, including nickel, to an external electrode connected to a through-electrode penetrating through a body.

According to another embodiment, a surface of an external electrode may have centerline average roughness Ra to form a nickel-plated layer on the external electrode.

According to another embodiment, a multilayer ceramic capacitor, having improved adhesion to a substrate while having a low profile, may be provided.

According to another embodiment, occurrence of cracking, caused by mismatching or the like in a sintering process, may be prevented to improve reliability of products.

While example embodiments have been shown and described above, it will be apparent to those skilled in the art that modifications and variations could be made without departing from the scope of the present disclosure as defined by the appended claims.

What is claimed is:

1. A multilayer ceramic capacitor comprising:
  a body including first and second internal electrodes, comprising nickel, laminated with a dielectric layer interposed therebetween, and having fifth and sixth surfaces opposing each other in a first direction, third and fourth surfaces opposing each other in a second direction, and first and second surfaces opposing each other in a third direction;
  a first through-electrode comprising nickel and penetrating through the body to be connected to the first internal electrode;
  a second through-electrode comprising nickel and penetrating through the body to be connected to the second internal electrode;
  first and second external electrodes disposed on the first and second surfaces, respectively, and each connected to the first through-electrode; and
  third and fourth external electrodes disposed on the first and second surfaces, respectively, to be spaced apart from the first and second external electrodes, and each connected to the second through-electrode,
  wherein each of the first to fourth external electrodes has a respective sintered electrode including nickel,
  wherein each of the first to fourth external electrodes includes a first plating layer, comprising nickel, disposed on the respective sintered electrode.

2. The multilayer ceramic capacitor of claim 1, wherein each of the first to fourth external electrodes has centerline average roughness ranging from 1 nm to 100 nm.

3. The multilayer ceramic capacitor of claim 1, wherein each of the first to fourth external electrodes further includes a second plating layer disposed on the first plating layer.

4. The multilayer ceramic capacitor of claim 3, wherein the second plating layer includes copper or tin.

5. The multilayer ceramic capacitor of claim 1, wherein each of the first and second through-electrodes protrudes from the second surface of the body.

6. The multilayer ceramic capacitor of claim 1, wherein the first to fourth external electrodes are sintered to the body.

7. The multilayer ceramic capacitor of claim 1, wherein each of the first to fourth external electrodes has a thickness ranging from 1 µm to 10 µm.

8. The multilayer ceramic capacitor of claim 1, wherein the body has a thickness of 100 µm or less in a stacking direction of the first and second internal electrodes.

9. The multilayer ceramic capacitor of claim 1, wherein the first through-electrode includes first and fourth connection electrodes each penetrating through the body to contact each of the first and second external electrodes, and
  the second through-electrode includes second and third connection electrodes each penetrating through the body to contact each of the third and fourth external electrodes.

10. The multilayer ceramic capacitor of claim 9, wherein the first and second internal electrodes each have a T shape to be point-symmetrical to each other,
  the first and fourth connection electrodes penetrate through a region of the body free of the second internal electrode, and
  the second and third connection electrodes penetrate through a region of the body free of the first internal electrode.

11. The multilayer ceramic capacitor of claim 10, wherein the regions of the body that are free of the first and second internal electrodes have rounded corners.

12. The multilayer ceramic capacitor of claim 9, wherein the first and second internal electrodes are each rectangular to be point-symmetrical to each other,
  the first internal electrode has a second via hole and a third via hole,
  the second internal electrode has a first via hole and a fourth via hole,
  the first and fourth connection electrodes penetrate through the first and fourth via holes, and
  the second and third connection electrodes penetrate through the second and third via holes.

13. The multilayer ceramic capacitor of claim 12, wherein a ratio D1/D3 of a distance D1 between centers of the first and fourth connection electrodes or a distance D1 between centers of the second and third connection electrodes to a distance D3 between the first via hole and the second via hole ranges from 2.08 to 4.7.

14. The multilayer ceramic capacitor of claim 12, wherein a ratio D2/D3 of a diameter D2 of the first connection electrode and a diameter D2 of the second connection electrode to a distance D3 between the first via hole and the second via hole ranges from 0.375 to 0.52.

15. A multilayer ceramic capacitor comprising:
a body including alternately stacked first internal electrodes and second internal electrodes laminated with dielectric layers interposed therebetween;
first and second through-electrodes penetrating through the body to respectively be connected to the first and second internal electrodes; and
first and second external electrodes disposed on a first surface of the body, respectively connected to the first and second through-electrodes, and each including a respective sintered electrode disposed on the first surface of the body and at least one plating layer disposed on the respective sintered electrode,
wherein each of the first internal electrodes, the first through-electrode, and the sintered electrode and at least one plating layer of the first external electrode include nickel (Ni).

16. The multilayer ceramic capacitor of claim 15, wherein each of the first internal electrodes and the first through-electrode has a content of nickel (Ni) therein higher than a content of any other element therein.

17. The multilayer ceramic capacitor of claim 15, wherein each of the first and second through-electrodes protrudes outwardly from the body through the first surface to respectively contact the first and second external electrodes, and
each of the first and second external electrodes has a first surface disposed on the first surface of the body, and a cavity extending from the first surface thereof to accommodate a portion of a respective one of the first and second through-electrodes protruding outwardly from the body.

18. The multilayer ceramic capacitor of claim 17, wherein each respective sintered electrode of the first and second external electrodes has the cavity extending therein, and each of the first and second external electrodes includes a first plating layer and a second plating layer sequentially laminated on the respective sintered electrode.

19. The multilayer ceramic capacitor of claim 15, wherein each of the second internal electrodes, the second through-electrode, and the sintered electrode and at least one plating layer of the second external electrode include nickel (Ni).

20. The multilayer ceramic capacitor of claim 15, wherein the multilayer ceramic capacitor further includes third and fourth external electrodes disposed on a second surface of the body opposite the first surface of the body, respectively connected to the first and second through-electrodes, and each including a respective sintered electrode disposed on the second surface of the body and at least one plating layer disposed on the respective sintered electrode,
wherein each of the first internal electrodes, the first through-electrode, and the sintered electrode and at least one plating layer of each of the first and third external electrodes include nickel (Ni).

21. The multilayer ceramic capacitor of claim 20, wherein each of the third and fourth external electrodes protrudes through the second surface of the body to respectively contact the first and second through-electrodes inwardly of the body.

22. A multilayer ceramic capacitor comprising:
a body including alternately stacked first internal electrodes and second internal electrodes laminated with dielectric layers interposed therebetween;
first and second through-electrodes penetrating through the body to respectively be connected to the first and second internal electrodes; and
first and second external electrodes disposed on a first surface of the body and respectively connected to the first and second through-electrodes,
wherein each of the first and second external electrodes includes a sintered electrode layer disposed on the first surface of the body and one or more plating layers sequentially disposed on the sintered electrode layer, and
each sintered electrode layer of the first and second external electrodes has a higher average roughness on a surface thereof facing the one or more plating layers than on a surface thereof facing the first surface of the body.

23. The multilayer ceramic capacitor of claim 22, wherein each sintered electrode layer has a centerline average roughness ranging from 1 nm to 100 nm on the surface thereof facing the one or more plating layers.

24. The multilayer ceramic capacitor of claim 22, wherein the sintered electrode layer of each of the first and second external electrodes includes nickel.

25. The multilayer ceramic capacitor of claim 22, wherein the multilayer ceramic capacitor further includes third and fourth external electrodes disposed on a second surface of the body opposite the first surface of the body and respectively connected to the first and second through-electrodes.

26. The multilayer ceramic capacitor of claim 25, wherein each of the third and fourth external electrodes includes a respective sintered electrode layer disposed on the second surface of the body and one or more plating layers disposed on the repsective sintered electrode layer,
wherein each of the first and second internal electrodes, the first and second through-electrodes, and the sintered electrode layer and one or more plating layers of each of the first, second, third, and fourth external electrodes include nickel (Ni).

* * * * *